United States Patent
Qiu et al.

(10) Patent No.: US 9,319,433 B2
(45) Date of Patent: Apr. 19, 2016

(54) PRIORITIZATION OF PROTOCOL MESSAGES AT A SERVER

(75) Inventors: Chaoxin Qiu, Austin, TX (US); Arshad Khan, Austin, TX (US); Niral Sheth, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 696 days.

(21) Appl. No.: 12/825,936

(22) Filed: Jun. 29, 2010

(65) Prior Publication Data

US 2011/0320555 A1  Dec. 29, 2011

(51) Int. Cl.
*G06F 15/16* (2006.01)
*H04L 29/06* (2006.01)
*H04L 29/08* (2006.01)

(52) U.S. Cl.
CPC ............ *H04L 65/1016* (2013.01); *H04L 63/08* (2013.01); *H04L 63/0892* (2013.01); *H04L 65/80* (2013.01); *H04L 67/322* (2013.01)

(58) Field of Classification Search
None
See application file for complete search history.

(56) References Cited

U.S. PATENT DOCUMENTS

| | | | |
|---|---|---|---|
| 5,426,943 A | 6/1995 | Althaus et al. | |
| 6,055,564 A | 4/2000 | Phaal | |
| 6,333,931 B1 | 12/2001 | LaPier et al. | |
| 8,078,737 B2 | 12/2011 | Cosmadopoulos et al. | |
| 8,908,610 B2 | 12/2014 | Zellner | |
| 2001/0054111 A1* | 12/2001 | Lee et al. | 709/245 |
| 2002/0161914 A1 | 10/2002 | Belenki | |
| 2004/0242233 A1* | 12/2004 | Lutgen | 455/445 |
| 2006/0291486 A1 | 12/2006 | Cai et al. | |
| 2008/0031258 A1 | 2/2008 | Acharya et al. | |
| 2008/0225727 A1 | 9/2008 | Yoshida et al. | |
| 2008/0228932 A1 | 9/2008 | Monette et al. | |
| 2008/0267376 A1 | 10/2008 | Khasnabish | |
| 2008/0298236 A1 | 12/2008 | Ervin et al. | |
| 2009/0144740 A1* | 6/2009 | Gao | 718/103 |
| 2009/0213837 A1* | 8/2009 | Ku et al. | 370/352 |
| 2009/0279547 A1* | 11/2009 | Mistry et al. | 370/392 |
| 2009/0285201 A1* | 11/2009 | Ben-Haim et al. | 370/352 |
| 2009/0307746 A1* | 12/2009 | Di et al. | 726/1 |
| 2010/0154057 A1 | 6/2010 | Ko et al. | |

(Continued)

OTHER PUBLICATIONS

H. Kaplan, http://tools.ietf.org/html/draft-kaplan-sip-session-id-00, A Session Identifier for the Session Initiation Protocol (SIP) draft-kaplan-sip-session-id-00, 9 pages, last accessed on May 28, 2010.

(Continued)

*Primary Examiner* — Scott B Christensen
(74) *Attorney, Agent, or Firm* — Amin, Turocy & Watson, LLP

(57) ABSTRACT

System(s) and method(s) are provided for prioritizing protocol messages received at a server. A client generates a request message and incorporates a data unit therein in order to indicate type of service application that triggered generation of the request message. The client conveys the request message to a server configured to respond to the request message. To supply data in response to the message request, the server prioritizes the request message based at least on the data unit that conveys the type of service application. The server can assign a set of request messages to a group of scheduling queues based at least on ranking of the type of service associated with at least one request message in the set of request messages. Based on performance conditions, the server also can reject one or more request messages according to the ranking.

20 Claims, 9 Drawing Sheets

(56) References Cited

U.S. PATENT DOCUMENTS

| | | | |
|---|---|---|---|
| 2010/0214924 A1 | 8/2010 | Alcina et al. | |
| 2010/0255826 A1 | 10/2010 | Brewer et al. | |
| 2011/0040845 A1* | 2/2011 | Cai et al. | 709/206 |
| 2011/0060771 A1 | 3/2011 | Llorente et al. | |
| 2011/0092211 A1 | 4/2011 | Osborn | |
| 2011/0149953 A1 | 6/2011 | Helgeson et al. | |
| 2011/0225307 A1 | 9/2011 | George et al. | |
| 2014/0120939 A1 | 5/2014 | Mang et al. | |
| 2015/0043343 A1 | 2/2015 | Filipovic et al. | |
| 2015/0358992 A1 | 12/2015 | Mang et al. | |

OTHER PUBLICATIONS

OA dated Feb. 17, 2012 for U.S. Appl. No. 12/789,742, 19 pages.

OA dated Jun. 18, 2012 for U.S. Appl. No. 12/789,742, pages.

Rosenberg et al., RFC 3261 SIP: Session Initiation Protocol. pp. 1-60, Jun. 2002, http://tools.ietf.org/html/rtc3261.

Office Action dated Aug. 7, 2014 for U.S. Appl. No. 12/789,742, 27 pages.

Office Action dated Feb. 23, 2015 for U.S. Appl. No. 12/789,742, 29 pages.

* cited by examiner

| APP TYPE | DIAMETER REQUEST MESSAGE | CLIENT APPLICATION | NETWORK NODE |
|---|---|---|---|
| INI_REG | MAR; SAR | INITIAL REGISTRATION | S-CSCF |
| RE_REG | MAR; SAR | RE-REGISTRATION | S-CSCF |
| INI_REG | UAR | INITIAL REGISTRATION | I-CSCF |
| RE_REG | UAR | RE-REGISTRATION | I-CSCF |
| CALL | LIR | CALL PROCESSING | I-CSCF |
| MWI | LIR | MESSAGE WAITING NOTIFY | I-CSCF |
| PRESENCE | LIR | PRESENCE SERVICE | I-CSCF |
| SMS | LIR | SHORT MESSAGING | I-CSCF |

FIG. 5

PRIORITIZATION OF PROTOCOL MESSAGES AT A SERVER

TECHNICAL FIELD

The subject disclosure relates generally to communication networks and, more specifically, to prioritization of protocol messages received at a server, wherein the prioritization is based at least on feature(s) of a service client, such as application client or a control client, that originates the protocol messages.

BACKGROUND

Various services in advanced networks, wireless or wireline, rely on packet-based protocols for delivery of data and signaling. Such advanced networks generally exploit a group of application servers that generate at least part of the data and signaling that provide content and enable specific functionality associated with a service, such as voice over internet-protocol (VoIP), IP multimedia content delivery, caller identification (ID) in IP television, etc. In certain architectures, the group of servers is deployed in an application layer, which is functionally coupled to a control layer that typically includes several session control components that enable a service session (e.g., a VoIP call, a data call, delivery of a pay-per-view movie . . . ). An example of such architecture is 3GPP IP Multimedia System (IMS) core network. In 3GPP IMS core network, a session control component is embodied in a control session control function (CSCF) node, which can be a Serving CSCF (S-CSCF) node, Interrogating CSCF (I-CSCF) node, a Proxy-CSCF (P-CSCF) or a transit function node. In addition, in 3GPP Long Term Evolution (LTE) networks, a Mobility Management Entity (MME) can embody a session control component.

To enable, in part, access of a subscriber device (mobile device, customer premises equipment, etc.) to network resources associated with a service, application servers, session control components, or other network nodes, generally acquire data from a centralized network repository, which operates as a master database. In 3GPP architecture for next generation networks (NGN), Home Subscriber Server (HSS) can embody the centralized network repository master user database. A HSS can contain subscription-related information (subscriber profiles, subscriber credentials, etc.). In addition, the HSS can perform authentication and authorization of a subscriber device, and can provide information about the subscriber's location and IP information. HSS also can provide services to call processing nodes, such as Call Session Control Functions (CSCF), or application feature servers in 3GPP IMS core network or 3GPP LTE networks.

Various protocol interfaces, such as Diameter protocol interfaces, enable access to data in HSS from a client. Such access to data is commonly accomplished via protocol messages, which generally are not equally critical or urgent. As an example, some Diameter queries from I-CSCF or S-CSCF are directed to registration or re-registration of subscriber devices (UEs, CPEs, etc.). While initial registration is critical for a subscriber device to receive subscribed services, re-registrations are not equally important and may remain without a response from HSS for a few minutes since a subscriber device typically requests re-registration several minutes (for example, 10 minutes) prior to registration expiration. As another example, some message requests from I-CSCF to HSS are directed to end-to-end call processing whereas other requests originated in I-CSCF are intended to an application that issues message waiting indications.

Additionally, in complex, large (e.g., several thousand nodes) next generation network deployments based on 3GPP IMS core network elements or 3GPP LTE network elements, performance of HSS can be subjected to various heavy-load or overload conditions. When a HSS load is heavy, it is desirable for HSS to favor more critical application requests rather than non-critical ones. Moreover, when a HSS is in an overload condition, the HSS can reject or silently drop some request messages; it is desirable for the HSS to reject or drop less critical requests first. Yet, in conventional network systems, it is common for the same client to employ the same type of Diameter message for different service applications directed to access data for different operation purposes. Accordingly, management of message requests at HSS typically fails to be efficient.

SUMMARY

The following presents a simplified summary of the subject disclosure in order to provide a basic understanding of some aspects thereof. The subject summary is not an extensive overview of the disclosure and it is intended to neither identify key or critical elements of the disclosure nor delineate any scope. The sole purpose of the subject summary is to present some concepts of the disclosure in a simplified form as a prelude to the more detailed description that is presented later.

One or more embodiments of the subject disclosure provide system(s) and method(s) for prioritizing protocol messages received at a server, wherein the protocol messages include an indication a client application that originates the protocol messages. A client generates a request message and incorporates a data unit in the request message, the data unit indicates type of service application that triggers generation of the request message. The client conveys the request message to a server in a centralized network repository, wherein the server is configured to respond to the request message. To supply data in response to the message request, the server prioritizes the request message based at least on the data unit that conveys the type of service application. The server can assign a set of request messages to a group of scheduling queues based at least on ranking of the type of service associated with at least one request message in the set of request messages. In the alternative or in addition, the server can assesses performance condition and can reject one or more request messages based at least on a ranking of the type of service associated with the one or more request messages.

Aspects, features, or advantages of the subject disclosure can be exploited in most any or any packet-based core network that relies at least on a request-reply messaging exchange with a network repository to access data related to providing packet-based service(s) to a subscriber device. The packet-based core network can be part of a wireline or wireless communication network.

To the accomplishment of the foregoing and related ends, the disclosure, then, comprises the features hereinafter fully described. The following description and the annexed drawings set forth in detail certain illustrative aspects of the disclosure. However, these aspects are indicative of but a few of the various ways in which the principles of the subject disclosure may be employed. Other aspects, advantages and novel features of the subject disclosure will become apparent from the following detailed description when considered in conjunction with the drawings.

BRIEF DESCRIPTION OF DRAWINGS

FIG. 5 displays an example set of attribute values for attributed name "App Type" applicable to AVPs in respective Diameter request messages according to aspects described herein.

DETAILED DESCRIPTION

Figure 1:
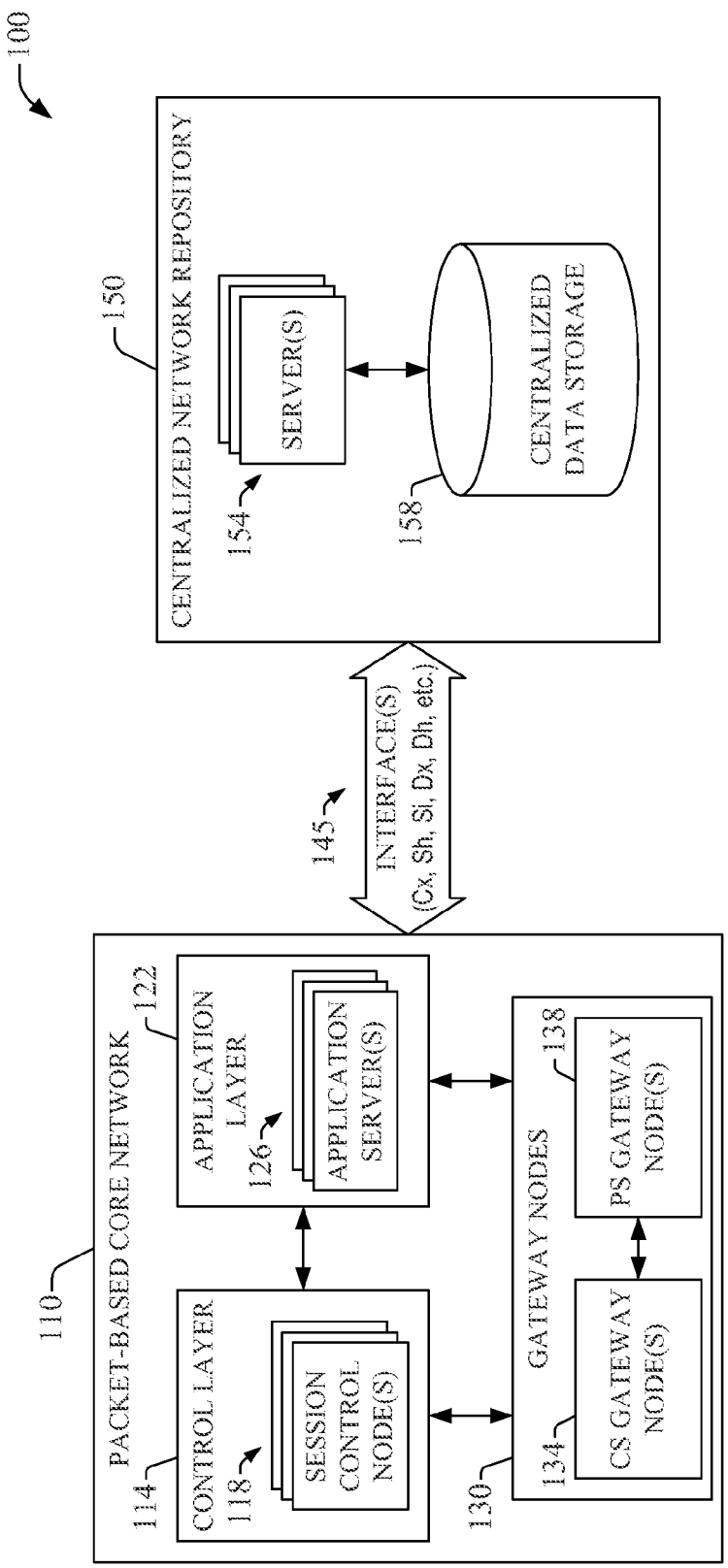
FIG. 1 is a schematic example network system that can operate in accordance with aspects described herein.

The subject disclosure is now described with reference to the drawings, wherein like reference numerals are used to refer to like elements throughout. In the following description, for purposes of explanation, numerous specific details are set forth in order to provide a thorough understanding of the subject innovation. It may be evident, however, that the subject innovation may be practiced without these specific details. In other instances, well-known structures and devices are shown in block diagram form in order to facilitate describing the subject innovation.

As used in this application, the terms "component," "system," "platform," "layer," "node," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Furthermore, in the subject disclosure, the term "set" is intended to refer to groups of one or more entities; for example, a set of data packets refers to one or more data packets. However, as employed herein, the term "subset" can include the empty set unless otherwise noted, as in cases in which, for instance, disclosure of a subset of one or more entities is intended to expressly avoid the empty subset.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth.

With reference to the drawings, FIG. 1 is a schematic example network system 100 that can operate in accordance with aspects described herein. A packet-based core network 110 provides a variety of services to a subscriber. The services include numerous packet-based services (e.g., IP-based services) comprising VoIP, video exchange, digital music exchange, digital photograph exchange, IP Television (IPTV) clips, or most any or any packetized digital content. In one or more embodiments, packet-based core network 110 is a 3GPP IMS core network. Service can be provided at least in part via a protocol for session establishment, such as session initiation protocol (SIP) or the H. 323 suite of signaling protocols. Packet-based core network 110 includes a control layer 114 that enables session establishment control and routing functionality for service sessions. Sessions primarily include data sessions; for example, VoIP call sessions. Control layer 114 can receive signaling that conveys a request to establish a session (call session, data session, etc.) and, in response to such request, routes the session to one or more application servers (e.g., application server(s) 126). Control layer 114 includes one or more session control node(s) 118. In example network system 100, the one or more application servers (ASs) are part of a set of application servers that are deployed within an application layer 122. The one or more ASs can include SIP AS(s), IP Multimedia Service Switching Function (IM-SSF) server(s), Customized Applications for Mobile Networks Enhanced Logic (CAMEL) server(s), or OSA Service Capability Server(s). In addition, as illustrated, packet-based core network 110 includes gateway nodes 130, comprising circuit-switched (CS) gateway node(s) 134 and packet-switched (PS) gateway node(s) 138; for example, embodiments in which packet-based core network 110 is a 3GPP IMS core network, CS gateway node(s) 134 can include Signaling Gateway node(s) (SWG) and PS gateway node(s) can include Media Gateway (MGW) node(s).

As part of the providing a service to a subscriber device (a mobile device, a customer premises equipment, etc.), packet-based core network 110 can acquire (e.g., extract, receive) data from a centralized network repository 150. Data acquired from the centralized network repository can be utilized by packet-based core network 110 to allocate network resources to a subscriber device. The centralized network repository 150 includes one or more server(s) 154 and a centralized data storage functionally coupled to the one or more server(s) 154. The centralized data storage 158 comprises subscriber data (subscriber profiles, subscriber credentials, etc.). In an aspect, centralized data storage 158 operates as a central logical unit, even though can be geographically distributed. In addition, centralized data storage 158 affords various redundancy mechanisms for data integrity, such as storage pairs. In embodiments in which packet-based core network 110 is a 3GPP IMS core network or a 3GPP LTE network, the centralized network repository 150 is a Home Subscriber Server; in such embodiments, the HSS can be a complex, large system with multiple servers (e.g., server(s) 154) deployed in multiple functional layers comprising a variety of modules that provide functionality to the HSS.

Acquisition of data from centralized network repository 150 can be enabled, at least in part, through interface(s) 145. Interface(s) 145 can include components that enable exchange of data and signaling amongst the packet-based core network 110 and the centralized network repository 150 in accordance with various access protocols (Kerberos protocol, Remote Authentication Dial In User Service (RADIUS) protocol, Terminal Access Controller Access-Control System Plus (TACACS+) protocol, Diameter protocol, Lightweight Directory Access Protocol (LDAP), etc.) and related transport protocols (Transmission Control Protocol (TCP), Stream Control Transmission Protocol (SCTP), etc.). Features of exchange of data and signaling can be specific to the network element, or network node, in packet-based core network (CN) 110 that communicates with centralized network repository 150, and one or more servers therein; such features can be provided through execution of one or more procedures in the network element. Accordingly, interface(s) 145 can enable, at least in part, a plurality of interfaces such as Cx, Sh, Si, Dx, Dh, Sha, or the like. Interface(s) 145 Interface(s) 145 can be embodied in at least one of conventional link(s) (e.g., a fiber optic link, an Ethernet link, a T1/E1 line, wireless link(s) . . . ), reference link(s) (e.g., Gi, Gn . . . ), or one or more components of an access network (not shown), which can be wireline or wireless and private, semiprivate or public.

A network element in packet-based core network 110 can be a client component, or client, of the centralized network repository 150 if an access protocol interface is available to the network element. For a network element that includes at least one procedure (e.g., a set of computer-executable instructions) and at least one component configured to execute the at least one procedure, the access protocol interface is available. As an example, in an embodiment in which packet-based CN 110 is a 3GPP IMS core network and centralized network repository is a HSS, a network element can be a HSS client if a Diameter protocol interface is available to the network element —S-CSCF nodes, I-CSCF nodes, P-CSCF nodes, application servers are HSS clients. Accordingly, exchange of data and signaling amongst such network element and a server in the set of servers 154 (represented as server(s) 154) can occur in accordance with various client-server modalities. In an aspect, at least one client in the set of servers 154 can receive a plurality of protocol messages from a client and, in response, the at least one server can supply one or more protocol messages. Aspects or features of the subject disclosure can be implemented in front-end servers, and scheduling modules therein, that interface with HSS clients directly. Various features or aspects of exchange of protocol messages amongst a client in packet-based core network 110 and a server in centralized network repository 150 are described next.

Figure 2:
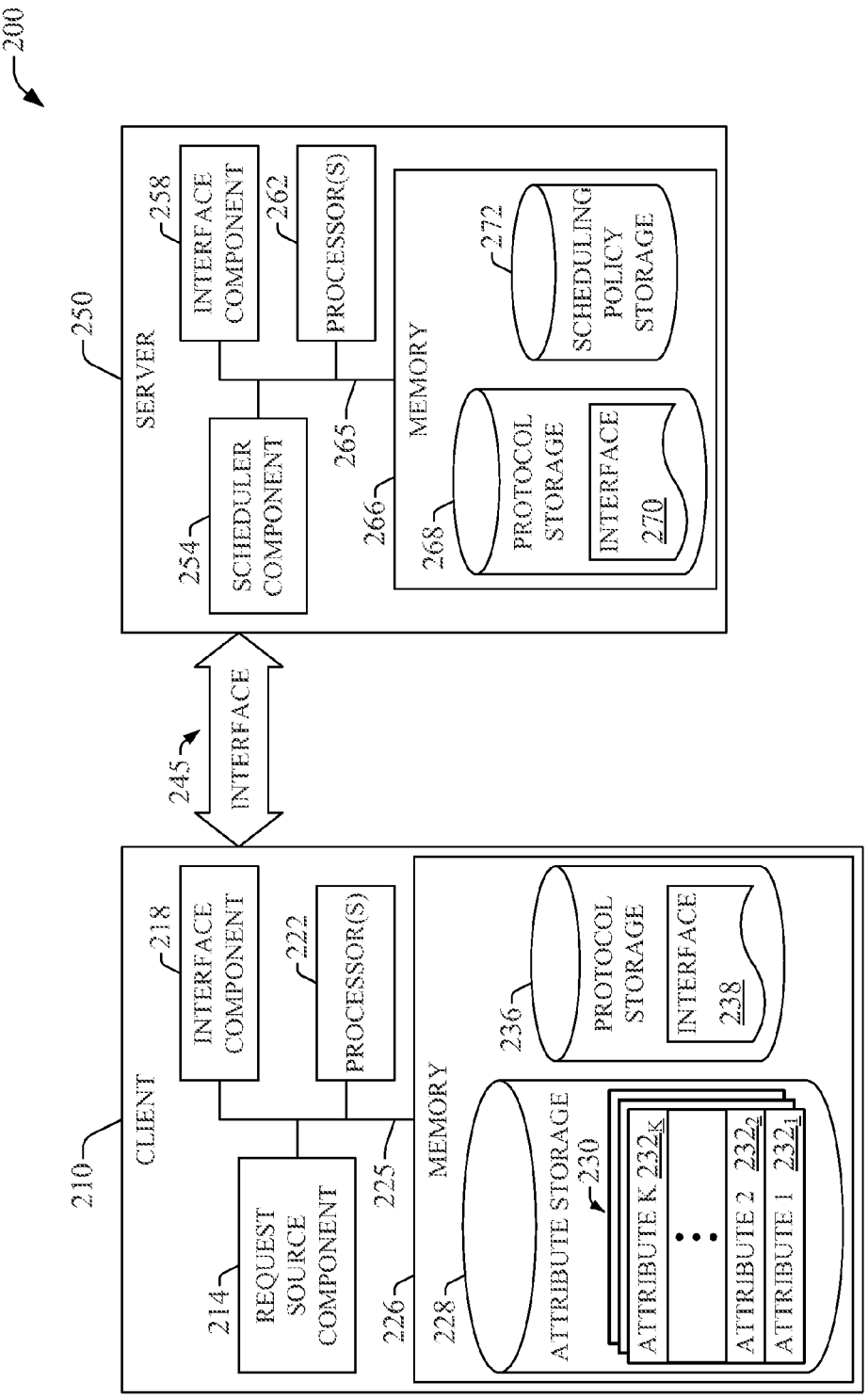
FIG. 2 represents an example client-server system that can enable and exploit prioritization of protocol message requests in accordance with aspects described herein.

FIG. 2 represents an example client-server system 200 that can enable and exploit prioritization of protocol message requests in accordance with aspects described herein. The subject example system includes a client component 210 and a server 250; in the subject specification and annexed drawings client component 210 is also referred to as client 210. In an aspect, client 210 can be a session control node (e.g., S-CSCF, I-CSCF, P-CSCF, or Breakout Gateway Control Function (BGCF)) within control layer 114 or an application server in application layer 122. In addition, client 210 can be a network access server (NAS) or a gateway node that is part of gateway nodes 130. Client 210 is functionally coupled (e.g., communicatively coupled) to server 250, which can be a server in the set of servers 154; as described supra, server 250 can enable management of data in a centralized storage layer (e.g., 158). In an aspect, such management can include collection of data, delivery of data, compression and restoration of data, reception and transmission of signaling, or the like. Interface 245 enables, at least in part, exchange of data and signaling amongst client 210 and server 250 in accordance with a communication protocol (e.g., TCP, SCTP). In addition, as indicated hereinbefore, the data and signaling that are exchanged can be specific to an access protocol, e.g., a protocol that accomplish a specific response to a request for access to network resources associated with client 210 and server 250—the access protocol can be a network attachment protocol, an authentication protocol, or an authentication, authorization, and accounting (AAA) protocol.

In the illustrated embodiment, the client component 210 includes a request source component 214 that can initiate a message associated with the access control protocol (e.g., Kerberos protocol, Diameter protocol, LDAP) in response to a request for service (not shown) received at the client component 210. In an aspect, the message can be a request message that is specific to the access control protocol (network attachment protocol, AAA protocol, etc.); for example, the request message can be a Diameter request message, such as Location-Info-Request (LIR), Multimedia-Authorization-Request (MAR), Server-Assignment-Request (SAR), or the like. A request message can include a data unit that conveys a type of service provided by the client 210 and the elicited generation of the request message. The data unit can be an attribute-value pair (AVP); however, data units other than AVPs also can be utilized. In an aspect, client 210 can exploit a set of data units retained in memory 226; in the illustrated embodiment, memory 226 includes an attribute storage 228 comprising a collection 230 of sets of attributes (e.g., set of attributes $232_1$-$232_K$, with K a positive integer) that can be specific to a message request (LIR, MAR, SAR, etc.). At least one attribute in at least one such set of attributes can be an AVP. The collection 230 is provisioned by a network operator that deploys (e.g., installs, configures, tests, and approves) the client 210. In certain embodiments, the collection 230 may be referred to as a dictionary of attributes and can be specific to the network operator. The network operator can administer (e.g., own and manage or lease and manage) a packet-based core network (e.g., 3GPP IMS core network) that includes client 210 (e.g., S-CSCF). In addition, one or more sets of attributes in the collection 230 are configurable and extensible, e.g., a set of attributes can be augmented or reduced, and can be specific to characteristics of the network deployed and administered by the network operator.

Request source component 214 generates a request message and incorporates a data unit (e.g., attribute-value pair) that characterizes the type of service that originated the request message; the attribute is one of the attributes in collection 230. In contrast to conventional systems, request source component 214 produces a request message that allows server 250 to distinguish amongst the same type of message requests issued by client 210. As an illustration, it should be appreciated that in a conventional (e.g., standardized) system (e.g., HSS in a 3GPP network), a S-CSCF node employs the same MAR and SAR messages for initial registration and re-registration processing, while I-CSCF uses the same LIR message for call processing and notification for message waiting in some implementation. In the subject disclosure, such messages can be readily distinguished through the data unit and can be incorporated in such messages.

Figure 3:
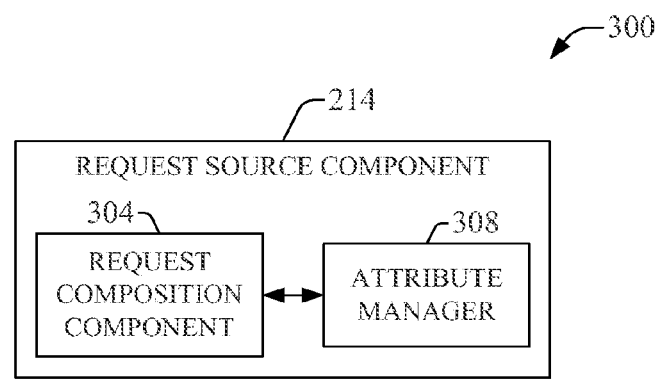
FIG. 3 illustrates an example embodiment a component that generates protocol message(s) in in accordance with aspects described herein.

In certain embodiments, e.g., example embodiment 300 illustrated in FIG. 3, request source component 214 includes a request composition component 304 that generates the request message and identifies the service application (or client application) that triggers the request message; for instance, client 210 can be an I-CSCF node and the service application can be Call Processing. In an aspect, request component component 304 selects an attribute name as part of an AVP intended to characterize the type of service that originated the message request. In an aspect, the attribute name can be "App Type", even though other names can be employed. In addition, request composition component 304 conveys such identification to attribute manager component 308, also referred to as attribute manager 308 in the subject disclosure. In response, and based at least on the identification of the service application, the attribute manager 308 extracts an attribute value from attribute storage 228, and supplies the attribute value to request composition component 304. Request composition component 304 incorporates the attribute value in the AVP intended to characterize the type of service and generates a message request, which can be a Diameter protocol request message, such as LIR, MAR, SAR.

To elicit generation of the request message (e.g., Diameter request message), client 210 can execute one or more procedures that embody a service application, also referred to as service. As an example, the service application can be an application that allows Initial Registration of a device, mobile or otherwise, or an application that allows Re-registration of the device. As another example, the request for service (not shown) can be a request for end-to-end session processing. As yet another example, the request for service (not shown) can be a request to issue (e.g., generate and deliver) a message waiting indication. In conventional systems (e.g., 3GPP IMS core network and HSS) a client can issue a single Diameter message request for a plurality of disparate service applications, wherein the client delivers the single Diameter message request to a server in a centralized network repository. In contrast, example client-server system 200 issues request message(s) that can convey a type of service via the data unit that discloses the type of service that provokes generation of the request message, and thus allows server 250 to distinguish request messages of the same type yet elicited in response to execution of disparate service applications.

The request source component 214 can convey the request message to interface component 218, which can deliver the request message to server 250. It should be appreciated that interface component 218 also can deliver reply or answer messages. Interface component 218 can be particular to client 210 and can execute a group of procedures (e.g., a software application or a firmware application) to implement a specific interface that allows exchange (e.g., delivery and reception) of data and signaling with server 250. The group of procedures can be retained in interface code 238, also referred to as interface 238, as part of protocol storage 236 in memory 226; code in interface 238 is computer-executable code. As an example, in embodiments in which client 210 is an application server, interface component 218 can implement, at least in part, a Sh interface. As another example, in embodiments in which client 210 is a S-CSCF node, interface component 218 can implement, at least in part, a Cx interface. As yet another example, interface component 218 can implement a Si interface in case client 210 is embodied in IM-SSF node.

In the illustrated example embodiment, client 210 includes one or more processor(s) 222 configured to provide, or that provide, at least part of the described functionality of request source component 214 and interface component 218. The one or more processor(s) 222 can execute computer-executable code instructions (not shown in FIG. 2) stored in memory 226 to provide the described functionality of client 210. Such computer-executable code instructions can include program modules or software application(s) or firmware application(s) that implement, for example, several of the methods described in the subject disclosure and associated, at least in part, with functionality of client 210. It should be appreciated that each of the one or more processor(s) 222 can be a centralized element or a distributed element. In distributed scenarios, the one or more processor(s) 222 can be part of the various components that comprise client 210. Memory 226 also stores data, such as data structures, data objects, metadata, numerical variables and parameters, logical variables, or the like. In addition, processor(s) 222, memory 226, and the various components within client 210 can exchange data and signaling via bus 225. In an aspect, bus 225 can be embodied in one or more of a system bus, an address bus, a message bus, a memory bus, a power bus in accordance with various hardware, firmware, or software implementations.

With respect to server 250, interface component 258 can receive protocol messages from client 210. To receive such messages, interface component 258 can execute a group of procedures (e.g., a software application or a firmware application) that implement an interface that enables exchange of data and signaling with client 210; the interface is specific to the client 210, e.g., Sx, Sh, Si, or the like. The group of procedures can be retained in interface code 270, also referred to as interface 270, as part of protocol storage 268 in memory 266; code in interface 270 is computer-executable code. In an aspect, interface component 258 receives a request message that includes an indication of the type of service that triggered the request message, as described supra. The interface component 258 can supply the request message to scheduler component 254, which exploits such indication of the type of service to prioritize a group of one or more request messages in accordance with a scheduling policy. As illustrated, the scheduling policy can be retained in scheduling policy storage 272 within memory 266.

The scheduling policy (not shown) can be based at least on an indication of type of service. In addition, the scheduling policy also can be based on at least on a class-of-service (COS) prioritization scheme. Moreover, the scheduling policy also can exploit one or more overload protection mechanisms. In addition, the scheduling policy (not shown) can be specific to architecture (e.g., software application(s) or hardware component(s)) of server 250. In an embodiment, server 250 can support multiple scheduling queues for incoming tasks. In such embodiment, and based in part on the indication of type of service (e.g., "App Type" attribute and related value), the scheduling policy (not shown) can enable scheduler component 254, for example, to rank and assign incoming message requests to different scheduling queues based at least in part on priority of a type of service provided by client 210. Priority of the type of service can be established by one or more operational criteria. In an additional or alternative embodiment, the scheduling policy (not shown) based at least on the indication of type of service (e.g., "App Type" information) can be part of an overload protection mechanism(s) (method(s), component(s), or combination thereof) available to server 250. The overload protection mechanism(s) mitigate overload condition(s) or remediate (e.g., recover from) overload condition(s). Values adopted by a group of key performance indicators (KPIs) of the server 250 can reveal overload or non-overload condition—if at least one KPI in such group is above a predetermined threshold, an overload condition is reached. Severity of the overload condition can be dictated by the number of KPIs that are above threshold. The group of KPIs can include a number of active processes or threads (e.g., processor load); a number of current or nearly current request messages; virtual memory usage, physical memory used. In situation(s) in which the server 250 is in overload condition, such scheduling policy (not shown) can enable server 250 to select one or more request messages to be rejected or dropped.

In the illustrated example embodiment, server 250 includes one or more processor(s) 262 configured to provide, or that provide, at least part of the described functionality of scheduler component 254 and interface component 258. The one or more processor(s) 262 can execute computer-executable code instructions (not shown in FIG. 2) stored in memory 266 to provide the described functionality of server 250. Such computer-executable code instructions can include program modules or software application(s) or firmware application(s) that implement, for example, various of the methods described in the subject disclosure and associated, at least in part, with functionality of server 250. It should be appreciated that each of the one or more processor(s) 262 can be a centralized element or a distributed element. In distributed scenarios, the one or more processor(s) 262 can be part of the various components that comprise server 250. Memory 266 also stores data, such as data structures, data objects, metadata, numerical variables and parameters, logical variables, or the like. In addition, processor(s) 262, memory 266, and the various components within server 250 can exchange data and signaling via bus 265. In an aspect, bus 265 can be embodied in one or more of a system bus, an address bus, a message bus, a memory bus, a power bus in accordance with various hardware, firmware, or software implementations.

Figure 4:
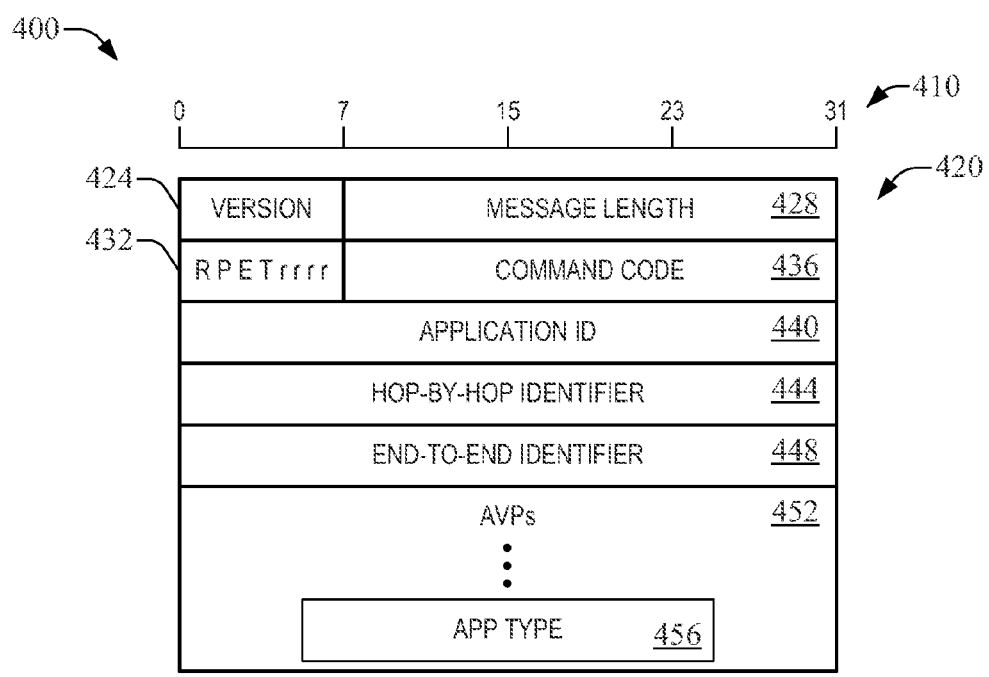
FIG. 4 represents an example Diameter protocol message in accordance with aspects of the subject disclosure.

FIG. 4 presents a diagram 400 of example Diameter protocol message 420 that enables issuance of a Diameter message request in accordance with aspects of the subject disclosure. Even though a message for Diameter protocol is illustrated, attribute name and related attribute values disclosed herein can be utilized to expand protocol messages I in other access protocols, such as Kerberos, RADIUS, TACACS+, or the like. Example diameter protocol message 420 includes a specific attribute-value pair (AVP) that is unavailable in conventional systems; such specific AVP enables a server that manages data in a centralized network repository (e.g., 110) to prioritize a Diameter request message based in part on a type of client (e.g., session control nodes, application servers, or network access servers) that triggers the Diameter request message.

Example Diameter protocol message 420 includes a Version field 424 of 1 octet (8 bits); scale 410 represents a span of 32 bits. For example, the Version field 424 can be set to 1 (e.g., 00000001) to indicate Diameter Version 1. To disclose the length of the Diameter message including the header fields a Message Length field 428, comprising three octets, is also included in the example Diameter protocol message 420. In addition, a 1-octet field represents a Command Flags field 432. Each bit in the Command Flags field 432 can be assigned as follows: If bit 0 is set to "R", then the example Diameter protocol message 420 is a request message; if bit 1 is set to "P", then the example Diameter protocol message 420 may be proxied, relayed, or redirected; if bit 2 is set to "E", then the example Diameter protocol message 420 contains a protocol error and is referred to as "error message"—such bit 2 is not configured in a request message (bit 1 set to R); if bit 3 is set to "T", then the example Diameter protocol message 420 is a potentially re-transmitted message. Bits 4-7 in the Command Flags field 432 are commonly reserved ("r") for customized utilization of the example Diameter protocol message 420.

The example Diameter protocol message 420 also includes a Command Code field 436, which spans three octets and conveys a command associated with the example Diameter protocol message 420. Furthermore, a four-octet Application Identifier (ID) field 440 is included to specify an application to which the example Diameter message 400 applies; the application can be an authentication application, an accounting application, or a vendor-specific application. Application ID field 440 can adopt a value within a first range of hexadecimal numbers established by Internet Assigned Numbers Authority (IANA) for standardized applications, or a value within a second range of hexadecimal numbers determined by IANA for vendor-specific applications, or services. A vendor-specific value can be assigned a "SMI Network Management Private Enterprise Codes" value encoded in network byte order. Further yet, a four-octet Hop-by-Hop Identifier field 444 and a four-octet End-to-End Identifier field 448 can be included to enable, respectively, matching requests and replies, and detecting duplicate messages.

Additionally, example Diameter protocol message 420 includes a set of 32-bit Attribute Value Pair (AVP) fields—such set is labeled with numeral 452 and referred to herein as set of AVPs 452. Such AVPs encapsulate information relevant to the example Diameter message 420. In an aspect of the subject disclosure, an AVP field 456 that discloses a type of application, or service, that elicits generation of the example Diameter protocol message is added in the set of AVPs 452— AVP field 456 can be incorporated in response to setting bit 1=R in the Command Flag field 432. As indicated supra, the subject AVP field is unavailable in conventional Diameter protocol messages.

As an illustration, AVP field 456 can be formed by an attribute name "App Type" and an attribute value (Att_value) characteristic of the client application, or client service, that triggers a request message. In an aspect, various attribute values can be defined for various request messages—diagram 500 in FIG. 5 presents an example set of attribute values for attribute name "App Type" applicable to respective Diameter request messages. As described supra, the AVP fields determined by ("App Type", Att_value) can be employed in AAA protocol(s) other than Diameter protocol. In addition, such AVP fields can be utilized in one or more authentication protocols (e.g., Kerberos protocol). As illustrated in diagram 500, and based on attribute values of "App Type", Diameter request messages Multimedia-Auth-Request (MAR; Command Code=303) and Server-Assignment-Request (SAR; Command Code=301) when triggered in response to execution of an "Initial Registration" application can be distinguished from MAR and SAR requests triggered in response to execution of a "Re-Registration" application. A message request elicited by execution of Initial Registration application includes an "INI_REG" value for "App Type", whereas a request message originated from execution of Re-Registration can include a "RE_REG" value for "App Type". Similarly, Diameter message request User-Authorization-Request (UAR) triggered by Initial Registration can be distinguished from UAR triggered by Re-Registration. Additionally or alternatively, Diameter message request Location-Info-Request (LIR) can be distinguished through disparate assignment of Att_value: (i) For LIR message in response to Call Processing service, Att_value can adopt the value "CALL"; (ii) for LIR message in response to Message Waiting Notify service, Att_value can adopt the value "MWI"; (iii) for LIR message in response to Presence Service application, Att_value can equate "PRESENCE"; and (iv) for LIR message that results from execution of Short Messaging service, Att_value can be "SMS".

At least one advantage emerges from the various aspects of the subject disclosure: A group of request messages of the same type (e.g., LIR) can be distinguished in accordance with type of service that originates each request message (e.g., LIR) in the group of request messages. As an example, the subject disclosure enables distinction amongst a LIR message originated from Message Waiting Notify service from another LIR message originated in Call Processing service. As another example, the subject disclosure also enables distinction amongst a MAR message due to Initial Registration service from a MAR message due to Re-registration service. Thus, as a result of such distinction, the group of request messages can be prioritized based at least on criticality of the service that elicits a message request. Accordingly, operation of a server in a centralized network repository (e.g., HSS in a 3GPP network) can be more efficient than in conventional systems, particularly, though not exclusively, in heavy-load or overload performance condition. Moreover, based at least on such distinction, scheduling disciplines and related scheduling policies can be enhanced through introduction of functionality that allows favoring critical message requests over non-critical message requests. It should be appreciated that in conventional systems, such distinction amongst a group of request messages of the same type is unavailable. Therefore, in conventional systems, scheduling policies typically prioritize according to request message type; type of interface associated with transport of a request message; type of network node, or call processor; yet, scheduling policies in conventional systems do not differentiate amongst type of client application, or service application, that originates a request message.

Various aspects of the subject disclosure can be automated through artificial intelligence (AI) methods to infer (e.g., reason and draw a conclusion based on a set of metrics, arguments, or known outcomes in controlled scenarios), for example, priority rankings for disparate AVPs that can be conveyed in a message request. Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set; e.g., the collected subscriber intelligence in the case of subscriber segmentation. In particular, one of numerous methodologies can be employed for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation also can be utilized. In addition, linear classifiers, such as support vector machines (SVMs), non-linear classifiers like methods referred to as "neural network" methodologies, fuzzy logic methodologies also can be employed.

In view of the example system(s) described above, example method(s) that can be implemented in accordance with the disclosed subject matter can be better appreciated with reference to flowcharts in FIGS. 6-9. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein can alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed methods can be implemented (executed, performed, etc.) in combination with each other, to accomplish one or more features or advantages described herein.

Method(s) disclosed throughout the subject specification and annexed drawings are capable of being stored on an article of manufacture to facilitate transporting and transferring such method(s) to computers or chipsets with processing capability(ies) for execution, and thus implementation, by a processor, or for storage in a memory. In an aspect, one or more processors that enact method(s) described herein can be employed to execute computer-executable code instructions retained in a memory, or any computer-readable or machine-readable medium, to implement method(s) described herein; the code instructions, when executed by the one or more processor implement or carry out the various acts in the method(s) described herein. The computer-executable code instructions, also referred to herein as code instructions, provide a computer-executable framework to enact, or implement, the method(s) described herein.

Figure 6:
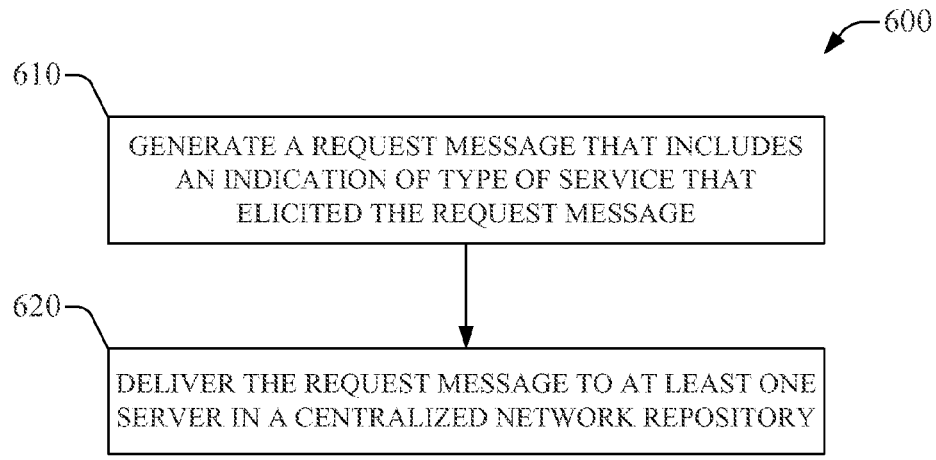
FIG. 6 presents an example method for issuing a request message within an authorization, authentication, and accounting (AAA) protocol in a communication network according to aspects described herein.

FIG. 6 presents a flowchart of an example method 600 for issuing a request message within an access protocol (e.g., authorization, authentication, and accounting (AAA) protocol) in a communication network according to aspects described herein. A client within a packet-based core network can implement (e.g., execute, instruct to execute, etc.). In an embodiment, as described supra, the packet-based network can be an IMS core network and the client can be a S-CSCF node, an I-CSCF node, or an application server. At act 610, a request message that includes an indication of type of service is generated. The client provides the service by executing an application and, in response to execution, the service elicits the request message. The request message is specific to the access protocol (e.g., AAA protocol) and the indication is a data unit or field attribute formatted in accordance with the access protocol (e.g., AAA protocol). In one or more embodiments, the AAA protocol is Diameter protocol and the request message is Diameter message with a command field octet set to "Request"; the data unit that embodies the indication is an attribute-value pair (AVP). In an aspect, the AVP can be identified generically as "Application Type" or "App Type" and assigned a representation code for insertion in a header of the AVP; as described supra, an "App Type" AVP has a specific attribute name related to the service (see, e.g., FIG. 5). At act 620, the request message is delivered to at least one server in a centralized network repository. In an aspect, the server is part of a data management layer and administers data (data structures, data objects, metadata, numerical variables and parameters, logical variables, etc.) in a centralized network repository layer.

Figure 7:
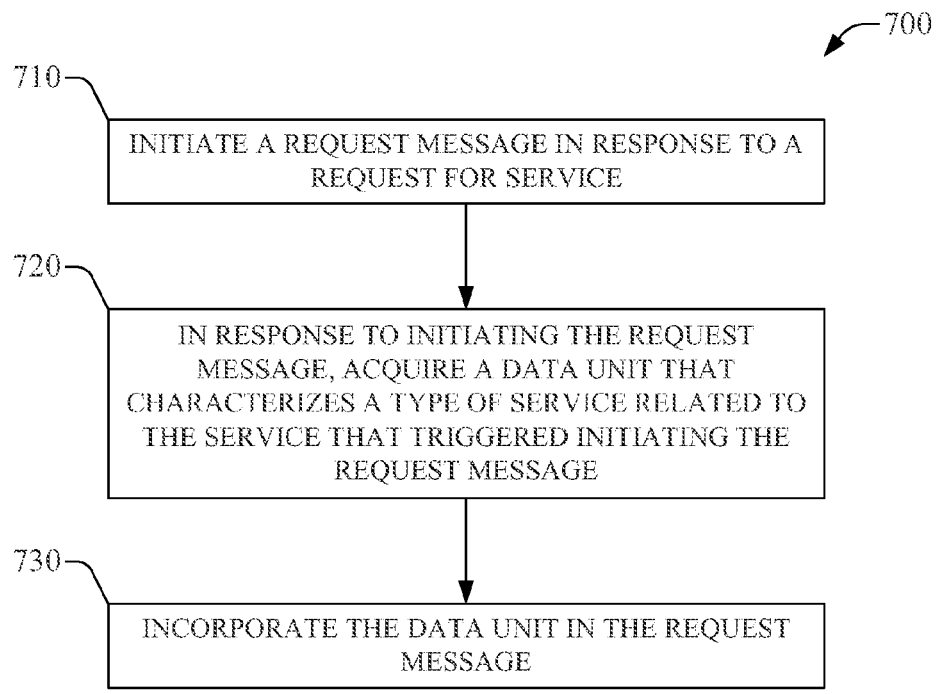
FIG. 7 presents an example method for generating a request message for an AAA protocol according to aspects described herein.

FIG. 7 presents a flowchart of an example method 700 for generating a request message according to aspects described herein. The subject example method can be part of act 610, and can be implemented (e.g., executed) by one or more components that implement example method 600. The subject example method also can be enacted by one or more processors functionally coupled to the one or more components, and that execute computer-readable code instructions retained in one or more memory(ies) to provide at least part of the functionality of the one or more network components. At act 710, a request message is initiated in response to a request for service. A client associated with the request for service can trigger, in part, the request message. Initiating the request message can include identifying such client and determining a set of field attributes related to the request message. The request for service can be in control plane (e.g., registration or re-registration of a device, mobile or otherwise) of the packet-based core network or in user plane (e.g., call session establishment request) of the packet-based core network. As discussed supra, the request message is specific to the access protocol (e.g., AAA protocol) and the indication is a data unit or field attribute formatted in accordance with the access protocol—e.g., Diameter protocol, RADIUS protocol, TACACS+ protocol, Kerberos protocol, or the like.

At act 720, a data unit is acquired (extracted, received, etc.) in response to initiating the request message; the data unit characterizes a type of service related to the service that triggered initiating the request message. In an aspect, the data unit can be retained in memory storage (e.g., a register, a database, a file . . . ) that is local to the client, or one or more components therein, that implement the subject example method. As described supra, the data unit can be formatted in accordance with the access protocol protocol. In a scenario in which the access protocol (e.g., AAA protocol) is Diameter protocol, the data unit can be an attribute-value pair (AVP); for example, the data unit can be an AVP that includes an attribute name, such as "Application Type" or "App Type", and a related attribute value, a described hereinbefore (see, e.g., FIG. 5). At act 730, the data unit is incorporated in the request message. As an example, for Diameter protocol, incorporating the data unit includes embedding it in the AVP portion of a Diameter message; the data unit can be a composite of various data that are introduced in the header of the Diameter message and as part of the payload data.

Figure 8:
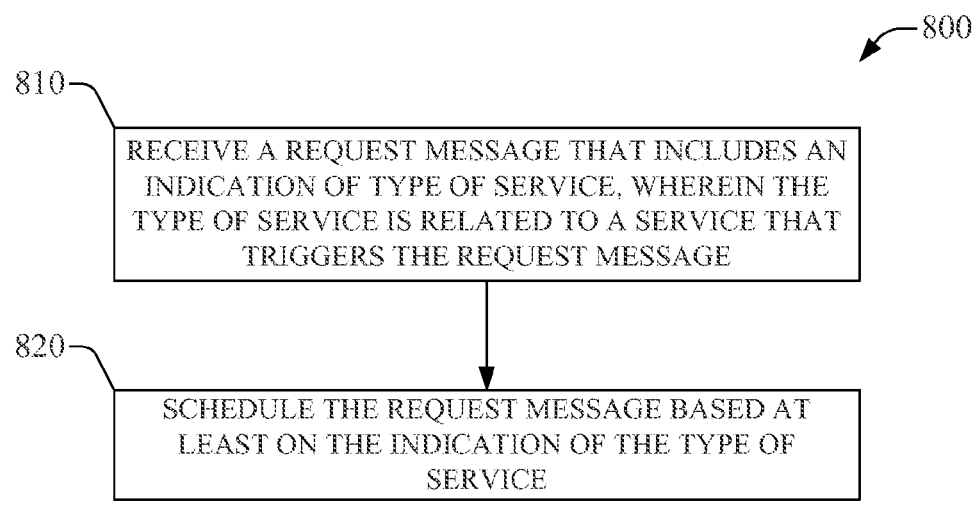
FIG. 8 displays an example method for managing a request message within an access protocol transaction according to aspects described herein.
Figure 9:
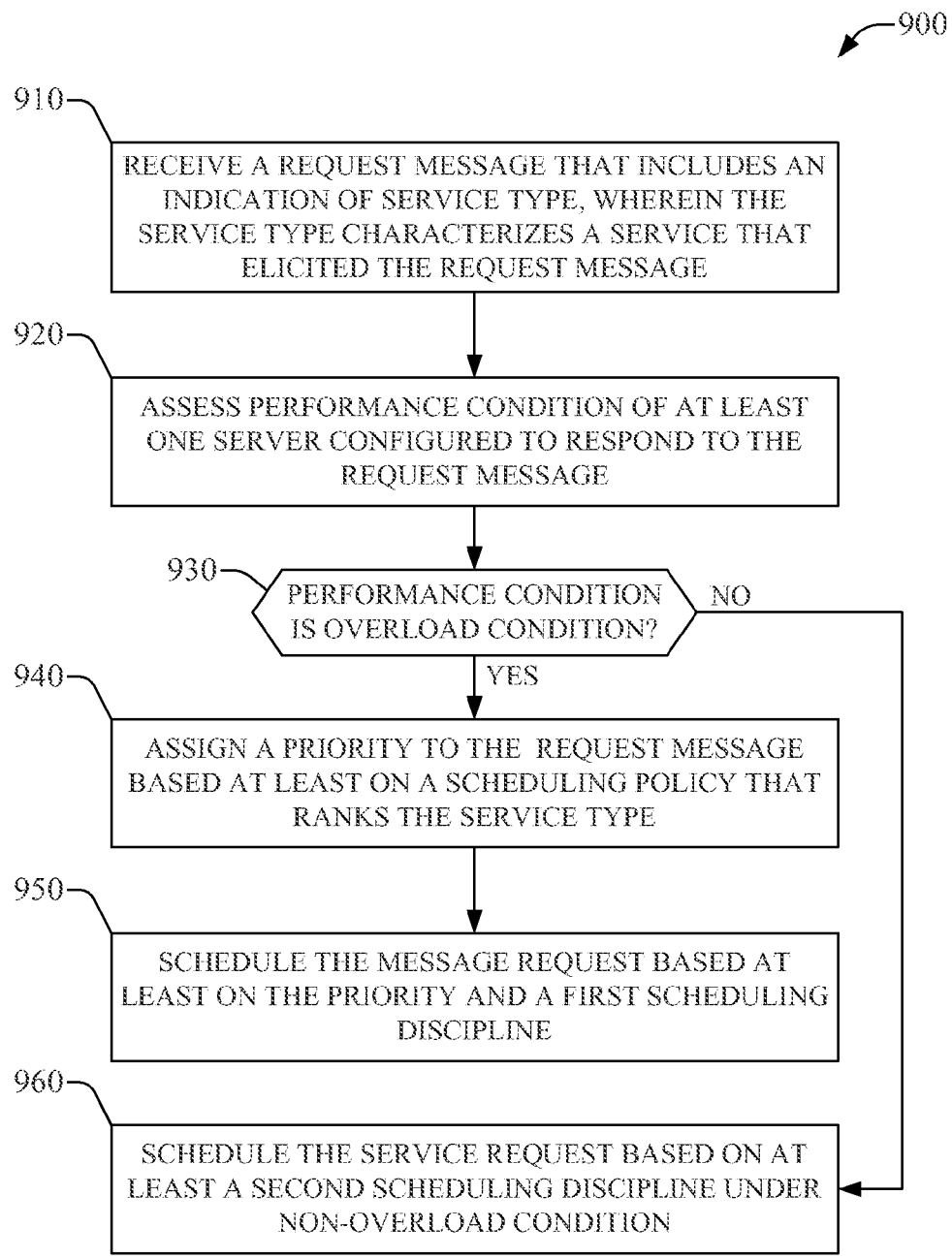
FIG. 9 illustrates an example method for prioritizing a request message within an access protocol according to aspects described herein.

FIG. 8 presents a flowchart of an example method 800 for managing a request message within an access protocol (e.g., AAA protocol) transaction according to aspects described herein. Such transaction can be part of providing service(s) in a communication network, wireless or otherwise. A server within the communication network can implement (e.g., execute, instruct to execute, etc.); the server can be part of a centralized network repository that is functionally (e.g., communicatively) coupled to a packet-based CN. In an embodiment, as described supra, the packet-based CN can be an IMS core network and the server can be a node (or a network element) within the Home Subscriber Server (HSS). At act 810, a request message is received, wherein the request message includes an indication of type of service. As described supra, the type of service is related to a service that triggers the request message. At act 820, the request message is scheduled based at least on the indication of the type of service. The server that implements the subject example method can exploit various scheduling disciplines in combination with the indication in order to prioritize the request message. As described supra, such prioritization can depend at least in part on architecture (software architecture, hardware architecture, or both) of the centralized network repository. In a scenario in which the architecture of the centralized network repository (e.g., HSS in 3GPP network) allows multiple scheduling queues for incoming tasks, a task scheduling policy based on the indication (e.g., an "App Type" AVP) can enable, at least in part, assigning or sorting a set of incoming request messages to a group of scheduling queues based at least on priority of each service type (or application type). Alternative or additional prioritization can be effected, such as that illustrated in FIG. 9.

Example method 900 illustrates a method for scheduling a message request; the subject example method is suitable for complementing or supplementing overload protection algorithm(s) employed by a server that receives the message request and that supplies a response, such as Diameter answer message. At act 910, a request message is received, wherein the request message includes an indication of service type that characterizes a service that elicited the request message. At act 920, a performance condition of at least one server configured to respond to the request message is assessed. Responding to the request message can include generating and delivering an answer message (e.g., a Diameter answer message). At act 930, it is determined if a performance condition is an overload condition. Determination can be based at least one a comparison of a group of KPIs of the at least one server with a group of respective predetermined thresholds; as described supra, the group of KPIs comprising a number of active processes or threads (e.g., processor load); a number of current or nearly current request messages; virtual memory usage, physical memory used. In the affirmative case, a priority is assigned to the request message based at least on a scheduling policy that ranks the service type at act 940. At act 950, the request message is scheduled based at least on the priority and a first scheduling discipline. In a scenario in which the performance condition is non-overload condition, at act 960, the request message is scheduled based on at least a second scheduling discipline under non-overload condition.

Figure 10:
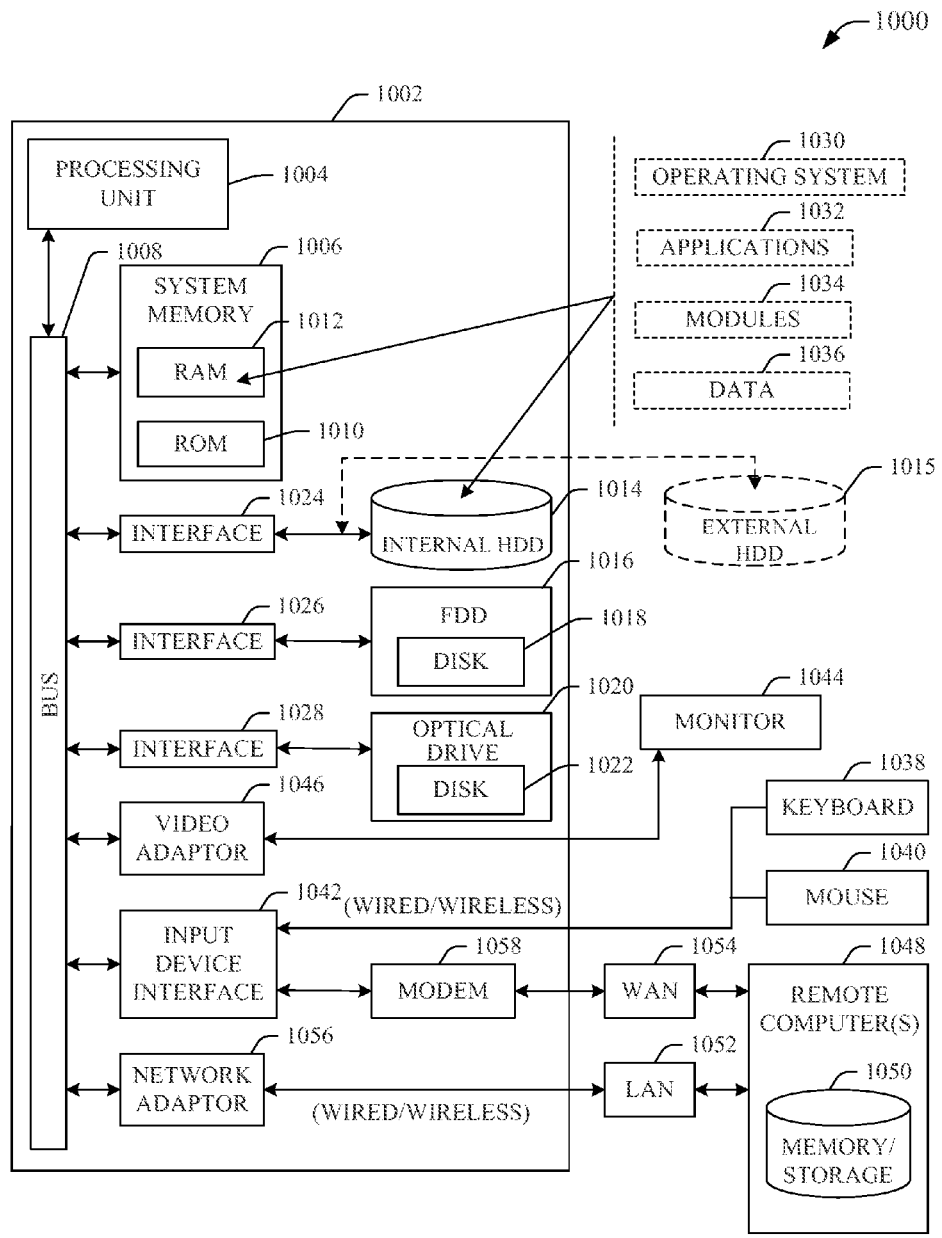
FIG. 10 presents an example computing environment in which the various aspects of the specification can be implemented.

In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a nonvolatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), or an external HDD 1015 can be present in addition to internal HDD 1014, a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 8 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
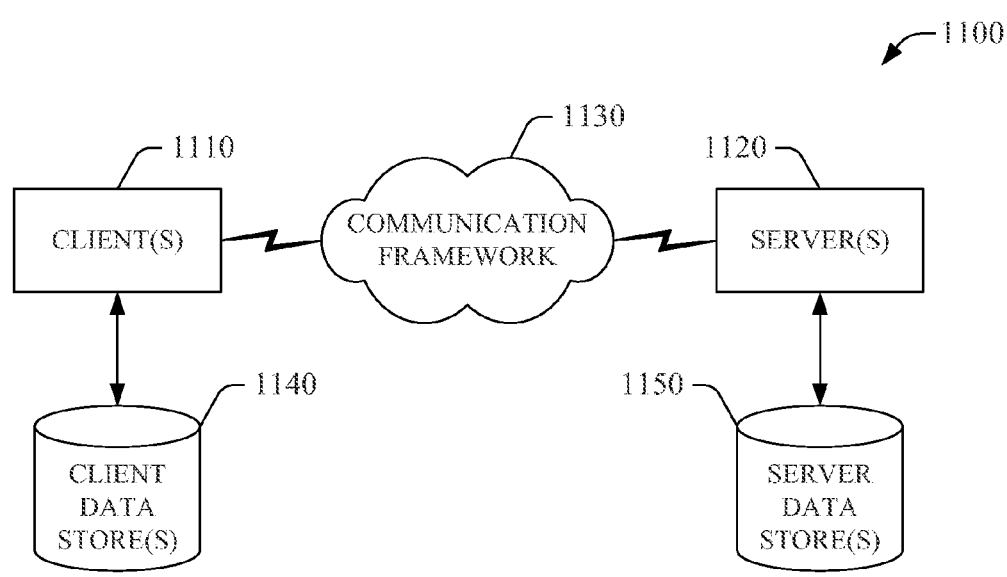
FIG. 11 presents a schematic block diagram of an example computing environment in accordance with aspects described herein.

FIG. 11 illustrates a schematic block diagram of an example computing environment 1130, in accordance with aspects described herein. The system 1100 includes one or more client(s) 1110. The client(s) 1110 can be hardware and/or software (e.g., threads, processes, computing devices). The system 1100 also includes one or more server(s) 1120. Thus, system 1100 can correspond to a two-tier client server model or a multi-tier model (e.g., client, middle tier server, data server), amongst other models. The server(s) 1120 can also be hardware and/or software (e.g., threads, processes, computing devices). The servers 1120 can house threads to perform transformations by employing the subject innovation, for example. One possible communication between a client 1110 and a server 1120 may be in the form of a data packet transmitted between two or more computer processes.

The system 1100 includes a communication framework 1130 that can be employed to facilitate communications between the client(s) 1110 and the server(s) 1120. The client(s) 1110 are operatively connected to one or more client data store(s) 1140 that can be employed to store information local to the client(s) 1110. Similarly, the server(s) 1120 are operatively connected to one or more server data store(s) 1150 that can be employed to store information local to the servers 1120.

It is to be noted that aspects, features, or advantages of the subject innovation described in the subject specification can be exploited in substantially any wireless communication technology. For instance, 4G technologies, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects of the subject innovation as disclosed in the subject specification can be exploited in legacy telecommunication technologies; e.g., GSM. In addition, mobile as well non-mobile networks (e.g., internet, data service network such as IPTV) can exploit aspect or features described herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification and annexed drawings, terms such as "store," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein can be implemented as a method, apparatus, or article of manufacture using standard programming and/or engineering techniques.

In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   receiving, by a server of a telecommunication network that stores subscriber data associated with subscriber identities subscribed to usage of network devices of the telecommunication network and comprises a processor, request data indicative of an authorization, authentication, and accounting message, in a first order, from a session control gateway device of the telecommunication network, wherein the request data comprises classification data representing respective types of applications that trigger requests in response to execution by a network device of the network devices;
   based on the classification data, generating, by the server, scheduling policy data indicative of a policy that specifies priority values of execution priorities of the types of applications, and specifies a second order in which the requests are to be processed based at least on the priority values; and
   based on the scheduling policy data, facilitating, by the server, a processing of the requests in the second order.

2. The method of claim 1, wherein the receiving comprises receiving the request data indicative of a first request triggered by a first application comprising a first application type and a second request triggered by a second application comprising a second application type, and wherein the first request and the second request comprise a common message type.

3. The method of claim 1, wherein the authorization, authentication, and accounting message conforms to an authentication, authorization, and accounting protocol, and wherein the classification data comprises an attribute-value pair associated with the authentication, authorization and accounting protocol.

4. The method of claim 1, further comprising:
   based on the scheduling policy data, assigning, by the server, a request of the requests to a queue of a group of scheduling queues.

5. The method of claim 1, wherein the determining comprises determining the scheduling policy data based on performance data indicative of a performance condition of the server.

6. The method of claim 5, wherein the determining comprises determining the scheduling policy information data in response to determining that the performance data satisfies an overload condition.

7. The method of claim 3, wherein the receiving comprises receiving the request data indicative of the authorization, authentication, and accounting message conforming to a diameter protocol.

8. A system comprising:
   processor; and
   a memory that stores executable instructions that, when executed by the processor, facilitate performance of operations, comprising:
      receiving, from a session control gateway device of a telecommunication network, message data indicative of authorization, authentication, and accounting messages that are received by a home subscriber server system in a first order, wherein the messages comprise classification data representing respective types of applications that initiate the authorization, authentication, and accounting messages in response to execution by a device of the telecommunication network;
      based on the classification data, determining scheduling policy data that is employable to determine priority values indicative of execution priorities of respective ones of the respective types of applications, and a second order in which the messages are to be processed based at least on the priority values, and
      based on the scheduling policy data, responding to the messages in the second order.

9. The system of claim 8, wherein an authorization, authentication, and accounting message of the authorization, authentication, and accounting messages is received in a format in accordance with an authentication, authorization, and accounting protocol, and the classification data comprises a data unit specific to the authentication, authorization, and accounting protocol.

10. The system of claim 9, wherein the authentication, authorization, and accounting protocol is a diameter protocol and the data unit specific to the authentication, authorization, and accounting protocol is an attribute value pair.

11. The system of claim 8, wherein the determining comprises determining the scheduling policy data based on class-of-service prioritization data.

12. The system of claim 8, wherein the operations further comprise:
    based on the priority values, assigning an authorization, authentication, and accounting message of the authorization, authentication, and accounting messages to a defined scheduling queue.

13. The system of claim 8, wherein the operations further comprise:
    assessing performance data indicative of a performance of the home subscriber server system, wherein the determining comprises determining the scheduling policy data in response to a determination that the performance data satisfies an overload condition.

14. The system of claim 8, wherein the home subscriber server system is comprised within a network node device of the telecommunication network, and wherein the telecommunication network comprises an internet protocol multimedia subsystem network device.

15. The system of claim 14, wherein the network node device is a serving-control session control function node device.

16. The system of claim 8, wherein the operations further comprise:
   determining that the home subscriber sever satisfies an overload condition; and
   based on the priority values, dropping an authorization, authentication, and accounting message of the authorization, authentication, and accounting messages.

17. A non-transitory machine-readable storage medium, comprising executable instructions that, when executed by a processor, facilitate performance of operations, comprising:
   receiving, from a session control gateway device of the telecommunication network, request data indicative of authorization, authentication, and accounting requests that are received by a server in a first order, wherein the request data comprises classification data representing respective types of applications that initiate the requests in response to execution by a device of the telecommunication network;
   based on the classification data, determining scheduling policy data that is utilized to determine priority values indicative of respective execution priorities of the respective types of applications, and a second order in which the requests are to be scheduled based at least on the priority values; and
   based on the scheduling policy information, facilitating a scheduling of the requests in accordance with the second order.

18. The non-transitory machine-readable storage device of claim 17, wherein the authorization, authentication, and accounting requests are associated with a common message type and the authorization, authentication, and accounting requests comprise a first request initiated by a first application determined to have a first application type and a second request initiated by a second application determined to have a second application type.

19. The non-transitory machine-readable storage device of claim 18, wherein an authorization, authentication, and accounting request of the authorization, authentication, and accounting requests is a message in an authentication, authorization, and accounting protocol and the classification data comprises a data unit associated with the authorization, authentication, and accounting request that is an attribute-value pair associated with the authentication, authorization, and accounting protocol.

20. The non-transitory machine-readable storage device of claim 17, wherein the operations further comprise:
   determining performance data representing a performance of the server wherein the determining the scheduling policy data comprises determining the scheduling policy data in response to determining the performance data satisfies an overload condition.

* * * * *